(12) United States Patent
Garay et al.

(10) Patent No.: US 9,268,023 B2
(45) Date of Patent: Feb. 23, 2016

(54) DROP DETECTION

(71) Applicant: Hewlett-Packard Development Company, L.P., Houston, TX (US)

(72) Inventors: Ernesto Garay, Gresham, OR (US); David Miller Lowe, Vancouver, WA (US); Trudy Benjamin, Portland, OR (US); Mark H. MacKenzie, Corvallis, OR (US); Gregory N. Burton, Camas, WA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/417,755

(22) PCT Filed: Sep. 25, 2012

(86) PCT No.: PCT/US2012/057101
§ 371 (c)(1),
(2) Date: Jan. 27, 2015

(87) PCT Pub. No.: WO2014/051549
PCT Pub. Date: Apr. 3, 2014

(65) Prior Publication Data
US 2015/0198715 A1 Jul. 16, 2015

(51) Int. Cl.
B41J 29/393 (2006.01)
G01S 17/02 (2006.01)
B41J 2/175 (2006.01)
(Continued)

(52) U.S. Cl.
CPC ............ *G01S 17/026* (2013.01); *B41J 2/0458* (2013.01); *B41J 2/04561* (2013.01); *B41J 2/125* (2013.01); *B41J 2/16579* (2013.01); *B41J 2/16585* (2013.01); *B41J 2/175* (2013.01); *B41J 2/2142* (2013.01); *B41J 2/2146* (2013.01); *B41J 29/393* (2013.01); *B41J 2/04558* (2013.01)

(58) Field of Classification Search
CPC ... B41J 2/0456; B41J 2/04558; B41J 2/04561
See application file for complete search history.

(56) References Cited

U.S. PATENT DOCUMENTS 5,627,571 A 5/1997 Anderson et al.
6,530,640 B1 3/2003 Vega et al.
(Continued)

FOREIGN PATENT DOCUMENTS

EP 1303294 A1 5/2003
WO WO-2012030344 A1 3/2012

OTHER PUBLICATIONS

International Search Report & Written Opinion received in PCT Application No. PCT/US2012/057101, Apr. 23, 2013, 9 pages.
(Continued)

*Primary Examiner* — Lisa M Solomon
(74) *Attorney, Agent, or Firm* — Fabian Van Cott

(57) ABSTRACT

A system for drop detection of fluid drops ejected by a printing device includes a drop detector comprising a radiation source and radiation sensor for illuminating a region in which drops are ejected by a print bar and detecting radiation from the radiation source that is reflected by backscattering from the drops to the radiation sensor; and a controller for controlling the drop detector and the print bar, wherein the controller uses a signal output by the drop detector to determine whether nozzles of the print bar are operating properly.

20 Claims, 8 Drawing Sheets

(51) Int. Cl.
*B41J 2/125* (2006.01)
*B41J 2/165* (2006.01)
*B41J 2/21* (2006.01)
*B41J 2/045* (2006.01)

(56) References Cited

U.S. PATENT DOCUMENTS 6,938,971 B2 9/2005 Gom z et al.
8,231,199 B2 7/2012 Hendricks et al.

2009/0244163 A1 10/2009 Govyadinov
2010/0259753 A1 10/2010 Shepherd et al.
2010/0289846 A1 11/2010 Portela et al.
2012/0223991 A1 9/2012 Ono

OTHER PUBLICATIONS

Kim, B-H. et al., "A Study of the Jetting Failure for Self-detected Piezoelectric Inkjet Printheads," (Research Paper), IEEE Sensors Journal, Dec. 2011, pp. 3451-3456, vol. 11, No. 12, available at http://ieeexplore.ieee.org/stamp/stamp.jsp?arnumber=5936091.

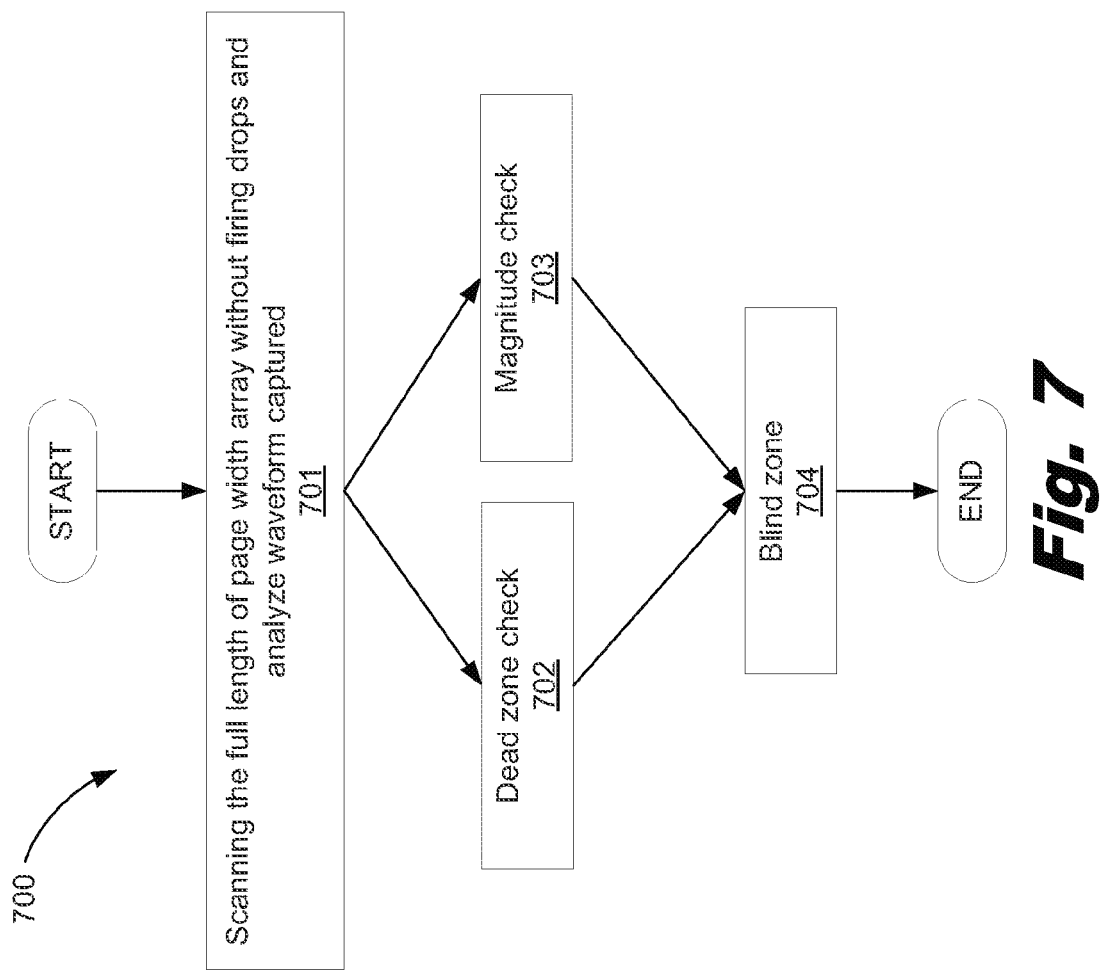

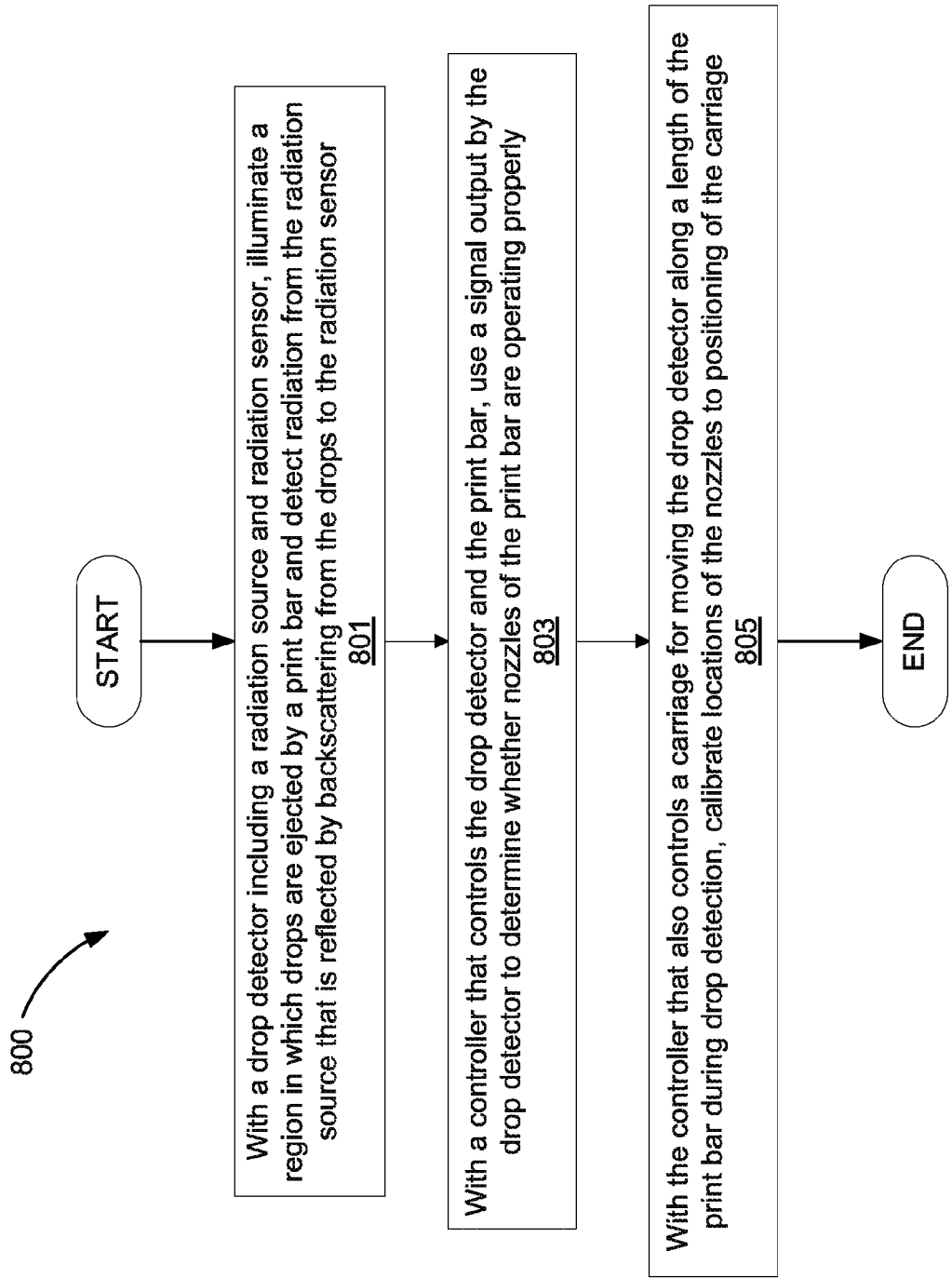

DROP DETECTION

BACKGROUND

An inkjet printing device is a fluid ejection device that provides drop-on-demand ejection of fluid droplets through printhead nozzles so as to print images onto a print medium, such as a sheet of paper. It is sometimes desirable to detect characteristics of ink drops ejected by an inkjet printing device. Characteristics of the ink drops may be used to assess the proper operation of the printing device. For example, detecting that ink drops are absent where they should be present and detecting the number, size, shape and/or color of ink drops may help determine whether nozzles through which ink drops are ejected are partially or fully clogged.

BRIEF DESCRIPTION OF THE DRAWINGS

The accompanying drawings illustrate various examples of the principles described herein and are a part of the specification. The examples do not limit the scope of the claims.

FIG. 7 is a flowchart showing a method to reduce the effects of backscatter noise and electrical noise, according to one example of principles described herein FIG. 8 is a flowchart of a method to calibrate relative positioning of a drop detector carriage and nozzles of the print bar according to one example of principles described herein.

Throughout the drawings, identical reference numbers designate similar, but not necessarily identical, elements.

DETAILED DESCRIPTION

Figure 1A:
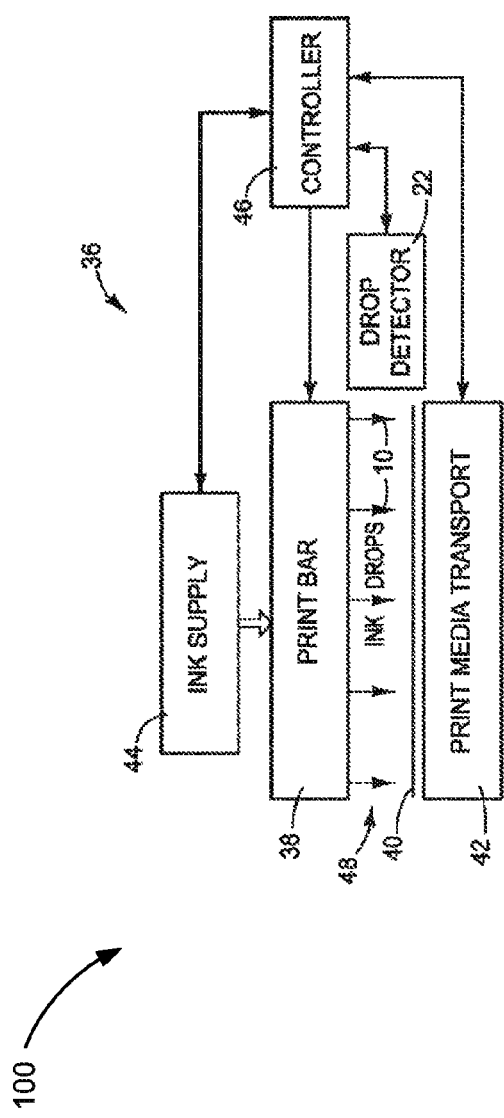
FIG. 1A is a block diagram illustrating one example of an inkjet printing device, according to one example of principles described herein.

As noted above, detecting ink drops that are absent where they should be present and detecting the number, size, shape and/or color of ink drops may help determine whether nozzles through which the ink drops are ejected are operating properly or are partially or fully clogged. Determining whether nozzles are operating properly may be particularly useful in single-pass print modes, such as in page-wide array (PWA) printing devices, where the option of passing the inkjet printhead over a section of a page multiple times generally does not exist. In a PWA, the printing element spans the width of the print medium and thus prints an entire line of the image simultaneously. Consequently, in single-pass or PWA printing, there is a significant increase in the number of print nozzles being used and a corresponding increase in the time and ink volume needed to keep the nozzles healthy.

One technique used for identifying nozzle issues is a backscatter drop-detection technique. This technique assesses nozzle functionality by monitoring light reflected by fluid drops ejected from the nozzles of the printing device. The data output by an optical detector detecting light backscattered by fluid or ink drops can then be used to determine if the nozzles are ejecting drops at all and whether the drops are of the appropriate size, shape, frequency, etc. Accordingly, the present specification describes a method for a drop-detection routine, including setup and error recovery routines and mitigation of background noise.

As used in the present specification and in the appended claims, the term "pen" is meant to be understood broadly as a printing device bar, page wide array, printhead, or any combination thereof which injects ink onto a printing medium using nozzles through which the ink is ejected.

As used in the present specification and in the appended claims, the term "routine" is meant to be understood broadly as a process that is executed by a processor using source code written to provide desired component functionality. A routine may run at a specified time interval, during setup and recovery processes, or when triggered by another event or routine.

Further, as used in the present specification and in the appended claims, the term "a number of" or similar language is meant to be understood broadly as any positive number comprising 1 to infinity; zero not being a number, but the absence of a number.

Aspects of the present specification may be embodied as a system, method, or computer program product. Accordingly, aspects of the present specification may take the form of hardware or a combination of hardware and software. Furthermore, aspects of the present specification may take the form of a computer program product embodied in a number of computer readable mediums having computer readable program code embodied thereon. Any combination of computer readable medium(s) may be utilized. A computer readable storage medium is a physical device that can contain, or store a program for use by or in connection with any instruction execution system, apparatus, or device such as, for example, a processor. The computer readable storage medium is non-transitory, meaning that it is a physical device and not merely a signal per se. Volatile forms of memory are considered non-transitory for purposes of this specification.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

In one example, the present specification discloses a system for drop detection of fluid drops ejected by a printing device. This system includes a drop detector having a radiation source and radiation sensor. The radiation source illuminates a region in which drops are ejected by a print bar, while the radiation sensor detects radiation from said radiation source that is reflected by backscattering from said drops to said radiation sensor. A controller controls this drop detector and the print bar. The controller uses a signal output by the drop detector to determine whether nozzles of the print bar are operating properly.

In some examples, the controller operates the print bar so as to separate black pigment from a carrier fluid in the nozzles so that drops of the carrier fluid are ejected during drop detection by the drop detector. In some examples, the drop detector includes a carriage for moving the drop detector along a length of the print bar during drop detection. In such examples, prior to drop detection, the controller calibrates locations of the nozzles to positioning of the carriage.

Referring now to the figures, FIG. 1A is a block diagram illustrating one example of an inkjet printing device (36) that includes a print bar (38) that spans the width of a print media (40). The printing device (36) also includes a media transport mechanism (42), a drop-detector (22), an ink supply (44), and an electronic printing device controller (46). Controller (46) represents generally the programming, processor(s) and associated memories, and the electronic circuitry and components needed to control the operative elements of the printing device (36). Print bar (38) represents generally an array of printhead modules each carrying one or more printhead dies and the associated mechanical and electrical components for dispensing ink drops onto a sheet or web of paper or other print media (40). Print bar (38) may represent multiple print bars that together span the print media (40).

A typical thermal inkjet printhead die, for example, includes an orifice plate arrayed with inkjet orifices and firing resistors that are formed on an integrated circuit chip positioned behind the ink ejection orifices. The printhead die(s) in each module are electronically connected to printing device controller (46) and fluidically connected to the ink supply (44). In operation, printing device controller (46) selectively energizes the firing resistors in a printhead die, or group of printhead dies, in the appropriate sequence to eject ink on to media (40) in a pattern corresponding to the desired printed image.

The drop detector (22) is used to detect the presence or absence of drops ejected from the print bar (38) or to detect characteristics of the drops. As noted above, the drop detector (22) is an optical detector that projects light into the area below the print bar (38) where fluid drops are ejected and monitors light reflected back by the drops. In some examples, the drop detector (22) is using an infrared Light Emitting Diode (LED) to emit an infrared beam which is backscattered back to the detector (22) by fluid drops ejected from the print bar (38). This is referred to as a backscatter drop-detection technique and enables assessment of nozzle functionality. The drop detector (22) may also include a carriage which moves the light source and optical sensor of the drop detector with respect to the print bar. In this way, the drop detector can check for the proper operation of nozzles of the print bar along the entire length of the print bar.

The drop detector (22) is driven by the controller (46) and returns data about the drops ejected from the print bar (38) to the controller (46). With this data, the controller (46) may make adjustments as to how it is driving the print bar (38) including substituting a working nozzle of the print bar (38) for one that the drop detector (22) indicates is non-functional or malfunctioning. The following figures will illustrate techniques for operating the controller (46) as it, in turn, operates the drop detector (22) and the print bar (38).

A drop-detection analysis, according to the principles described herein, may be conducted when the printing device is first started up and/or at regular intervals during the operation of the printing device to ensure that the printing device is continuing to operate properly. Additionally, the detection of some error condition may also trigger a drop-detect analysis.

Figure 1B:
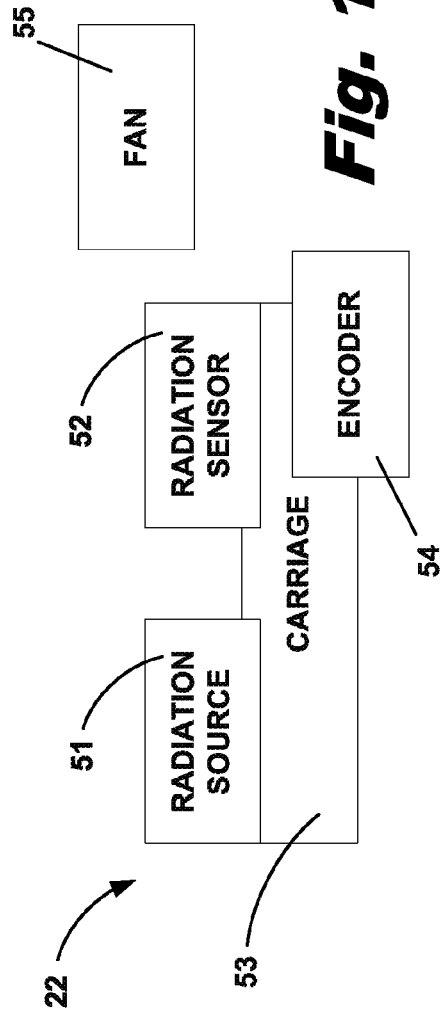
FIG. 1B is a block diagram illustrating one example of a drop detector according to principles described herein.

FIG. 1B illustrates further details of the drop detector (22) of FIG. 1A. As shown in FIG. 1B, the drop detector (22) may include a radiation source (51) with which to illuminate a region where drops are ejected by the print bar (FIG. 1A, 38). This radiation source (51) may be, for example, an infrared (IR) light emitting diode (LED). The drop detector (22) further includes a radiation sensor (52) that detects the backscattering of radiation output by the radiation source (51).

The drop detector (22) may further include a carriage (53) for moving the drop detector (22) relative to the print bar (FIG. 1A, 38). An encoder (54) outputs a signal indicative of movement and, hence, positioning of the drop detector (22).

Figure 2:
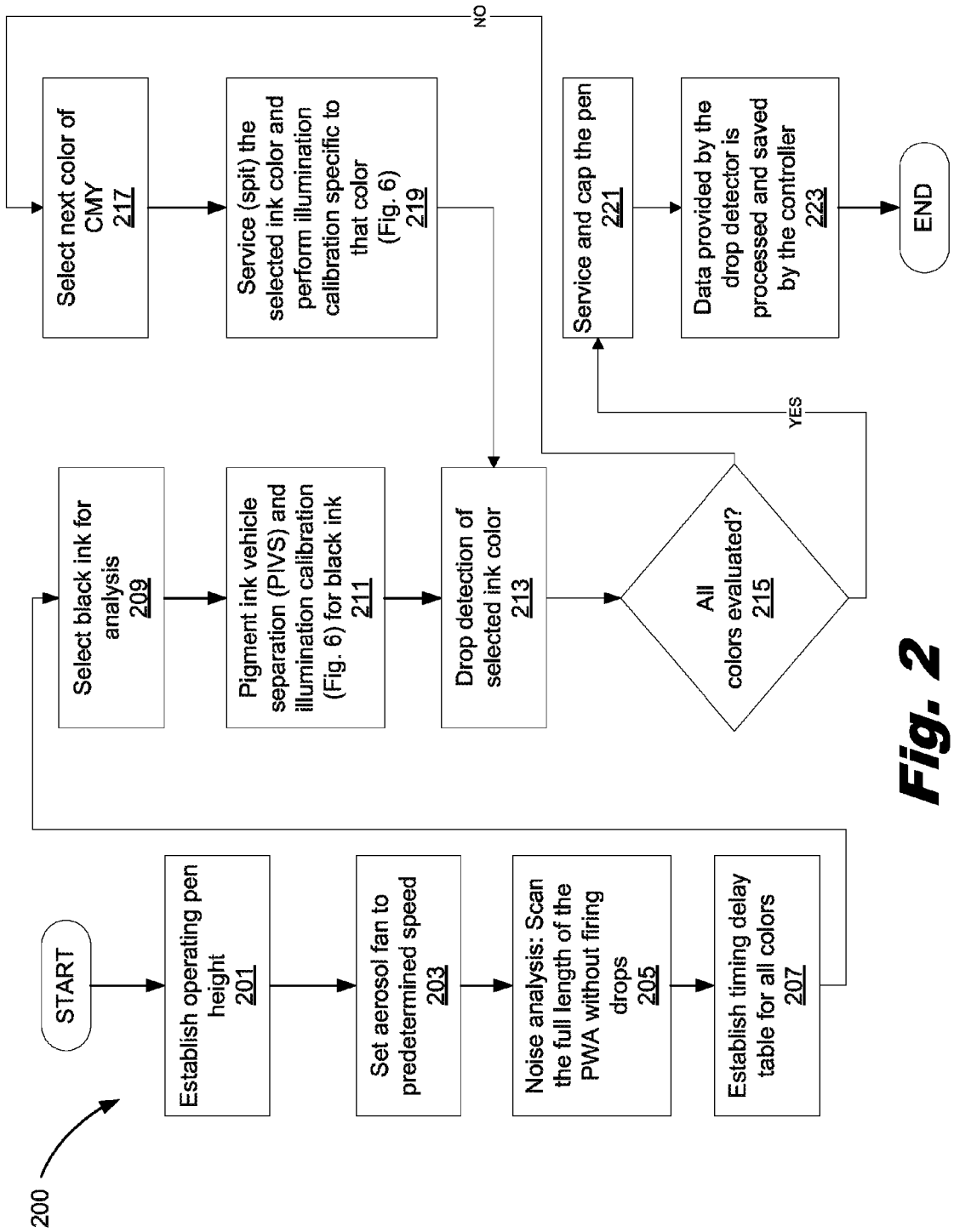
FIG. 2 is a flowchart of a method for a drop-detection scan process for a page width array, according to one example of principles described herein.

FIG. 2 is a flowchart of a method for a drop-detection process for a page width array, according to one example of principles described herein. The elements of FIG. 2 provide an overall listing of principles disclosed herein. These elements may occur at different points in the operational life of a printing device. Additionally, not all of the actions shown in FIG. 2 are performed each time the drop-detection routine is executed. For example, some of the listed actions are only performed when the printing device is manufactured and initially calibrated. Some of the listed actions are performed if the printing device is starting up or is recovering from an error and are not performed if the drop detection process is being executed during ongoing or normal operation of the printing device.

Action (201) is performed during manufacture and initial calibration of the printing device or may be performed upon device start up or error recovery. In this Action, the pen height for drop detection is established (201). This can be done using the routine detailed in FIG. 4 and corresponding text provided in a later section of this specification. Determining the pen height increases the accuracy of the subsequent drop detection results.

In the drop-detection process, a fan (FIG. 1B, 55) can be operated, for example, by being set (203) to a pre-determined speed. The operation of the fan (55) prevents aerosol clouds from forming around the print bar. Such clouds may form from ink vaporized and ejected from the print bar that is not delivered to its target, such as a print medium. Such aerosol clouds will naturally interfere with the operation of the drop detector (FIG. 1, 22) by causing unwanted backscattering of light which produces noise in the output of the detector (22).

Next, the drop detector (22) scans (205) the full length of print bar without the print bar firing any drops. This allows the controller (FIG. 1, 46) to determine a noise floor and any blind areas that will be taken into account when drop-detection starts. This subject matter is further detailed in FIG. 7 and corresponding text provided in a later section of this specification.

If the printing device is being calibrated at start up or upon error recovery, this scan without ejected drops is followed by setting up the nozzles, on a per die-basis, to fire in alignment to any carriage movement. This calibration includes establishing (207) a timing delay table, with delays specific to each color of ink used. This portion of the process is detailed in FIG. 5 and corresponding text provided in a later section of this specification.

Generally, the drop detection process can be performed repeatedly, once for each color of ink that the printing device uses. If black ink is used in the printing device, one iteration of the drop detection process may be performed for detecting the health of nozzles that dispense black ink. Where this is the case, the process may include selecting (209) black ink for analysis.

For black ink, the drop-detection process may include a separation (211) of the black pigment from its carrier fluid. Where black ink is ejected for detection by the drop detector (FIG. 1, 22), the black drops may be harder for the detector to detect that drops of a more reflective color. Consequently, in a process known as pigment ink vehicle separation (PIVS), the black pigment of the ink is separated from the carrier fluid of the ink. The carrier fluid, which may be clear and much more reflective, is then ejected in drops that can be more readily detected by the drop detector (FIG. 1, 22) to assess the health of the black ink nozzles. The process for pigment separation is further detailed in FIG. 3 and corresponding text provided in a later section of this specification. In addition to pigment Additionally, a process of illumination calibration is performed for the nozzles that eject black ink. This calibration process is detailed in a later section of this specification including FIG. 6 and the corresponding text.

After this preparation, actual drop detection (213) is performed. Drops of a selected ink color, or carrier fluid in the case of black ink, are ejected by the nozzles of the print bar (FIG. 1A, 38). The drop detector (FIG. 1, 22) illuminates and thus detects backscattering of radiation from the ejected drops. This may include applying a skip pattern and bi-directional scans to separate overlapping nozzles such that the health of each nozzle can be determined. A decap spit service for the pen may also be performed at prescribed scanning intervals for colors that need that service.

As indicated, this drop-detection process can be repeated for each color. Thus, a determination (215) is made whether the nozzles for each color of ink have been evaluated. If not, the next color is selected (217). In some examples, the printer may use Black (K), Cyan (C), Magenta (M) and Yellow (Y) ink. Thus, after nozzles for blank ink have been tested, another color among CMY is selected and so on until the nozzles for all ink colors have been evaluated. After any particular color is selected for nozzle evaluation, the nozzles for that color are brought to an operational temperature by spitting and illumination calibration for that color is performed (219). The process of illumination calibration is detailed in a later section of this specification including FIG. 6 and the corresponding text.

Following evaluation of all the nozzles, the pen and cap of the print bar are serviced (221). Additionally, the data provided by the drop detector (FIG. 1, 22) is processed (223) by the controller (FIG. 1, 46). This processing determines which nozzles may be malfunctioning or non-functional and what areas may be blind spots for the drop-detection process. The controller (FIG. 1, 46) may then substitute overlapping nozzles or other nozzles for those that are not healthy to improve the quality of the printing.

Figure 3:
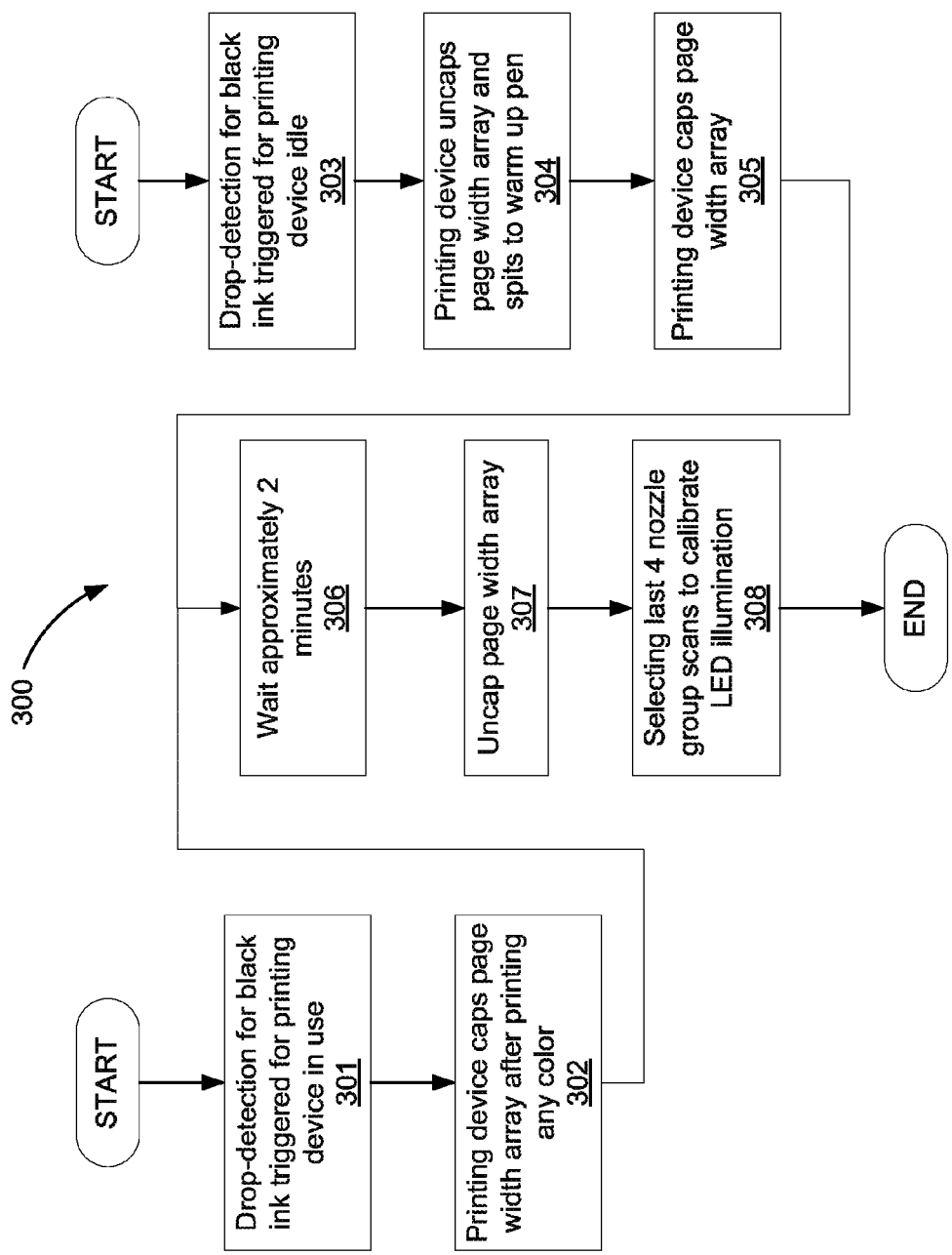
FIG. 3 is a flowchart showing a method to accelerate the pigment ink vehicle separation, according to one example of principles described herein.

As noted above, FIG. 3 illustrates details for preparing the pen or print bar for the drop-detection process and for dealing, in particular, with black ink detection. For these purposes, FIG. 3 is also a flowchart showing a method to accelerate the pigment ink vehicle separation (PIVS), according to one example of principles described herein.

As mentioned above, the drop detector (FIG. 1, 22) is used to detect the presence or absence of drops ejected from the print bar or to detect characteristics of the drops. The drop detector (FIG. 1, 22) is an optical detector that projects light at the print bar and monitors light reflected by fluid drops ejected from the nozzles of the print bar. However, detecting a black ink drop using the drop-detector (FIG. 1, 22), even under ideal illumination, is challenging. This is because a black ink drop will absorb the light projected without any light being reflected back to the drop detector that can be used to determine the health of a nozzle. Consequently, the drop detector (FIG. 1, 22) is unable to determine if a black ink drop has been fired from a nozzle or the nozzle is clogged.

Alternative, by separating the black pigment and ink as described below, a clear drop can be fired for drop detection and testing purposes from a nozzle that otherwise dispenses black ink or other marking fluid. Consequently, the clear drop will reflect the light projected back to the drop detector (FIG. 1, 22) to allow detection of the presence or absence of the drop or characteristics of the drop. Compared to a black drop, the clear drop increases backscattering detection up to 20 times, thereby producing a more desirable signal-to-noise ratio (SNR). Consequently, the drop detector (FIG. 1, 22) is able to determine the health of each nozzle.

Heating the pen to its operational temperature and capping the pen allows for the separation of the black ink and pigment in order to produce clear drops to be fired from the print bar (FIG. 1, 38) and to be detected by the drop detector (FIG. 1, 22). According to certain illustrative examples, the method includes two start modes for drop-detection for black ink, namely printing device "in use" (301) and printing device idle (303).

In the printing device "in use" (301) routine, the pen is presumably already heated to its operational temperature. Thus, the printing device (302) caps the PWA (FIG. 1, 38) after printing any current color plane and waits (306) approximately 2 minutes. During this waiting period, a carrier fluid of the black ink and the black pigments in the carrier fluid separate. As mentioned above this separation is desired in order to produce clear drops, which are mostly just carrier fluid, to be used to reflect the light reflected back to the drop detector (FIG. 1, 22).

Alternatively, if the printing device is idle (303), particularly if the printing device has been idle for a period of time, the pen is warmed to its operational temperature. In this case, the routine uncaps (304) the PWA (FIG. 1, 38) and spits to warm up the pen. The printing device then caps (305) the PWA, and waits (306) approximately 2 minutes. As mentioned above, during this waiting period, the black ink and pigments separate.

After the waiting period of 2 minutes is complete for either mode (301, 303), the routine continues by uncapping (307) the PWA. The method continues by selecting (308) the last 4 nozzle group scans to calibrate LED illumination of the clear drops. By selecting (308) the last 4 nozzle group scans to calibrate LED illumination, as described in connection with FIG. 6, the controller (FIG. 1, 46) checks whether the routine is under the PIVS domain. In FIG. 3, the LED is calibrated as described in connection with FIG. 6, indicating the routine is under PIVS domain.

As mentioned above, the drop detector (FIG. 1, 22) is driven by the controller (FIG. 1, 46) and returns data about the drops ejected from the print bar (FIG. 1, 38) to the controller (FIG. 1, 46). With this data, the controller (FIG. 1, 46) may make adjustments as to how it is driving the print bar (FIG. 1, 38) including substituting a working nozzle of the print bar (FIG. 1, 38) for one that the drop detector (FIG. 1, 22) indicates is non-functional or malfunctioning.

As indicated, a number of clear ink drops is fired from each nozzle. The LED, as described in connection with FIG. 6, illuminates each clear drop. The light projected onto the clear drop is reflected back to the drop detector (FIG. 1, 22) which uses that backscattered light to detect the presence or absence of drops ejected from the print bar or to detect characteristics of the drops.

After all nozzles have been scanned, the pen and cap are serviced. At this point, clear fluid drops are no longer desired for further operation. Thus, during this service routine the black pigment and ink are normalized, meaning that the black pigment is no longer separated from the carrier fluid. Thus, these nozzles will return to dispensing black ink in further operation.

As will be apparent, this process need only be conducted for nozzles that eject black ink or marking fluid. For nozzles that eject lighter colored drops, backscattering can and detection can occur without separating the pigment from the clear liquid vehicle, as described here. However, the elements of spitting, capping and servicing may be performed for any color of ink. Similarly, selecting the a four nozzle group to calibrate LED illumination (308) and conducting scanning from nozzle zero to the last nozzle (309) may be performed for any color of ink.

Figure 4:
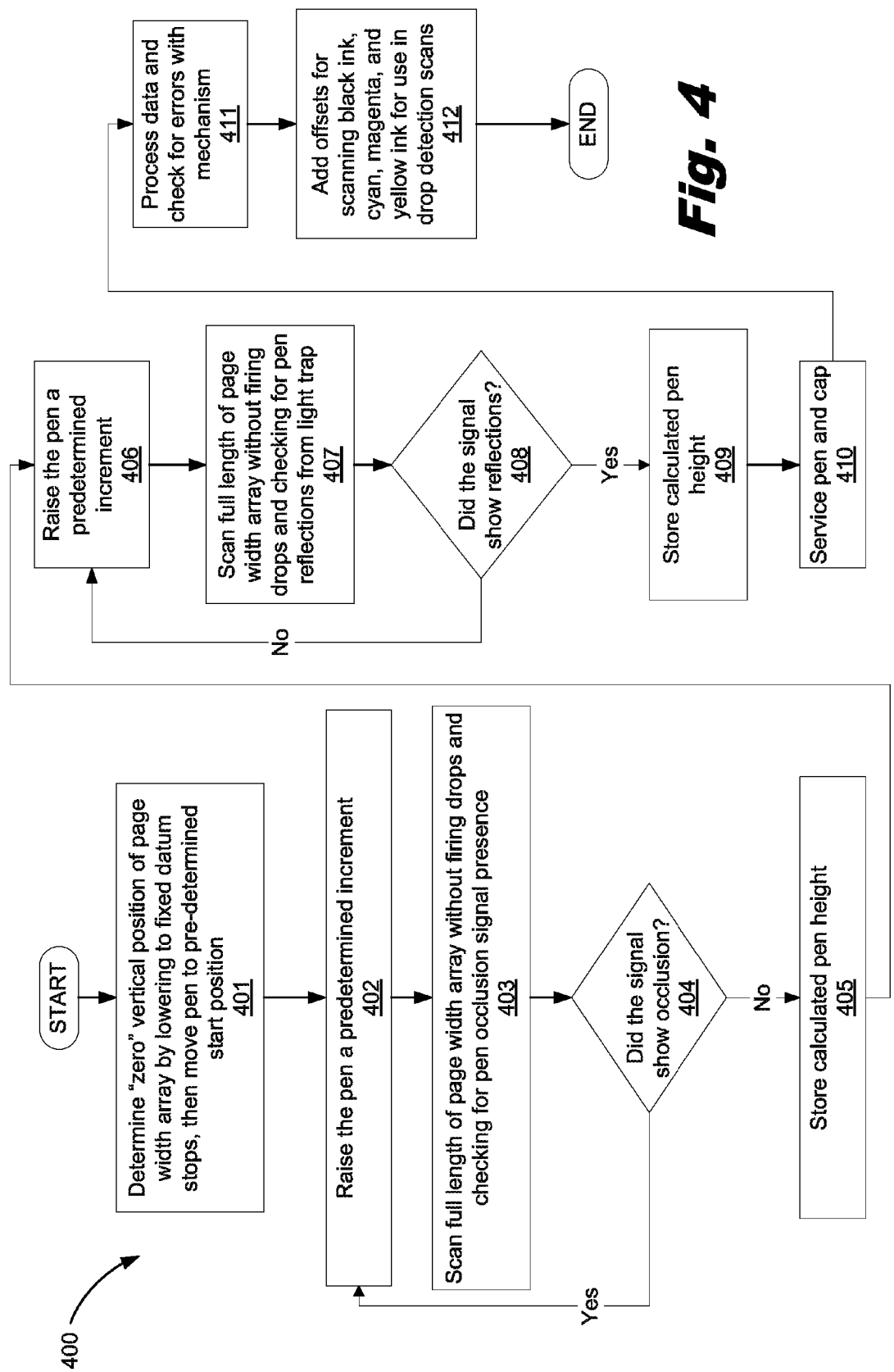
FIG. 4 is a flowchart showing a method to calibrate pen height positioning tolerances with respect to the scanning sensor, according to one example of principles described herein.

Turning to FIG. 4, FIG. 4 is a flowchart showing a method (400) to calibrate pen height positioning tolerances with respect to the scanning sensor, according to one example of principles described herein. Due to manufacturing tolerances, precision for printing parts is not always achieved. The height of the pen (FIG. 1, 38) may vary from printing device to printing device. Consequently, it may be desired to adjust the pen (FIG. 1, 38) height for optimal sensing conditions by the drop detector (FIG. 1, 22).

In one example, if the pen (FIG. 1, 38) height is too low the pen (FIG. 1, 38) will occlude the drop detector's (22) sensor. Consequently, the drop detector (FIG. 1, 22) is unable to detect ink drops (FIG. 1, 10) being fired from the nozzle. Alternatively, if the pen (FIG. 1, 38) height is too high, the ink drops (FIG. 1, 10) being fired from the nozzle tend to slow down and a single ink drop may break apart into a number of smaller ink drops before detection by the detector (FIG. 1, 22). Consequently, the smaller ink drops may not scatter enough light back to the drop detector (FIG. 1, 22) resulting in errors with detecting ink drops. Consequently, the described method of FIG. 4 determines and may adjust for the height of the pen.

This routine illustrated in FIG. 4 is executed as a setup or error recovery routine. For example, this routine may be executed at the factory during production of the printing device or when error checking determines massive nozzle outages.

As mentioned above, the drop detector (FIG. 1, 22) is used to detect the presence or absence of drops ejected from the print bar or to detect characteristics of the drops. However, if the pen height is too low or too high, the drop detector (FIG. 1, 22) may be unable to detect reflections from the ink drops sufficient to determine whether to substitute a different nozzle for any nozzle not detected as producing a drop when fired.

Consequently, a zero vertical position on a PWA is found (401) by lowering the pen to occlude the drop detector (FIG. 1, 22) sensor. Thus, by lowering the pen to a zero position relative calculations may be made from this reference point. After reaching the zero vertical position, the process proceeds with raising (402) the pen by a predetermined increment from the zero vertical position. Scanning (403) is then performed along the full length of the PWA without firing drops and checking whether the pen is occluding the detector.

If the routine determines (404) the presence of an occlusion, the method proceeds with raising (402) the pen a predetermined increment and repeating the scanning (403) for occlusion. This process is repeated any number of times until no occlusion is found.

When the pen has been raised such that the detector is no longer occluded (404), the current value for the pen height is then noted and stored (405) as pen minimum height for drop detection. Thus, the minimum height of the pen is determined in which the drop detector (FIG. 1, 22) is able to detect ejected ink drops.

Having determined the minimum height for drop detection and having raised the pen above the point at which it occludes the detector (FIG. 1, 22), the process then continues by further raising (406) the pen a predetermined increment and scanning (407) the full length of the PWA. During this scan, the detector (FIG. 1, 22) looks for reflections from a light trap. The resulting signal is checked (408) for reflections.

If the routine does not determine a reflection indicating detection of the light trap, the pen is raised (406) by a predetermined increment and a full (407) scan of the PWA is performed again without firing drops and seeking reflection from the light trap. This process is repeated a number of times until reflections indicating detection of the light trap are found.

When the light trap is detectable by the detector (FIG. 1, 22), the pen is considered to be at a maximum height for drop detection. Accordingly, the current height of the pen is the noted and stored (409) as the maximum pen height for drop detection. The pen is then serviced (410) and caped.

After all this data has been acquired, processing (411) of the data and checking for errors with the mechanism occurs. Additionally, on the pen, nozzles dedicated to ejected black ink may be separate from and have a different height on the pen relative to nozzles ejecting colored inks, for example, Cyan, Magenta and Yellow (CMY). In fact, each color channel may require a unique pen height for optimum drop detection. Consequently, these height differentials may be noted and accounted (412) for in the pen height values within which drop detection may be calibrated and performed.

Figure 5:
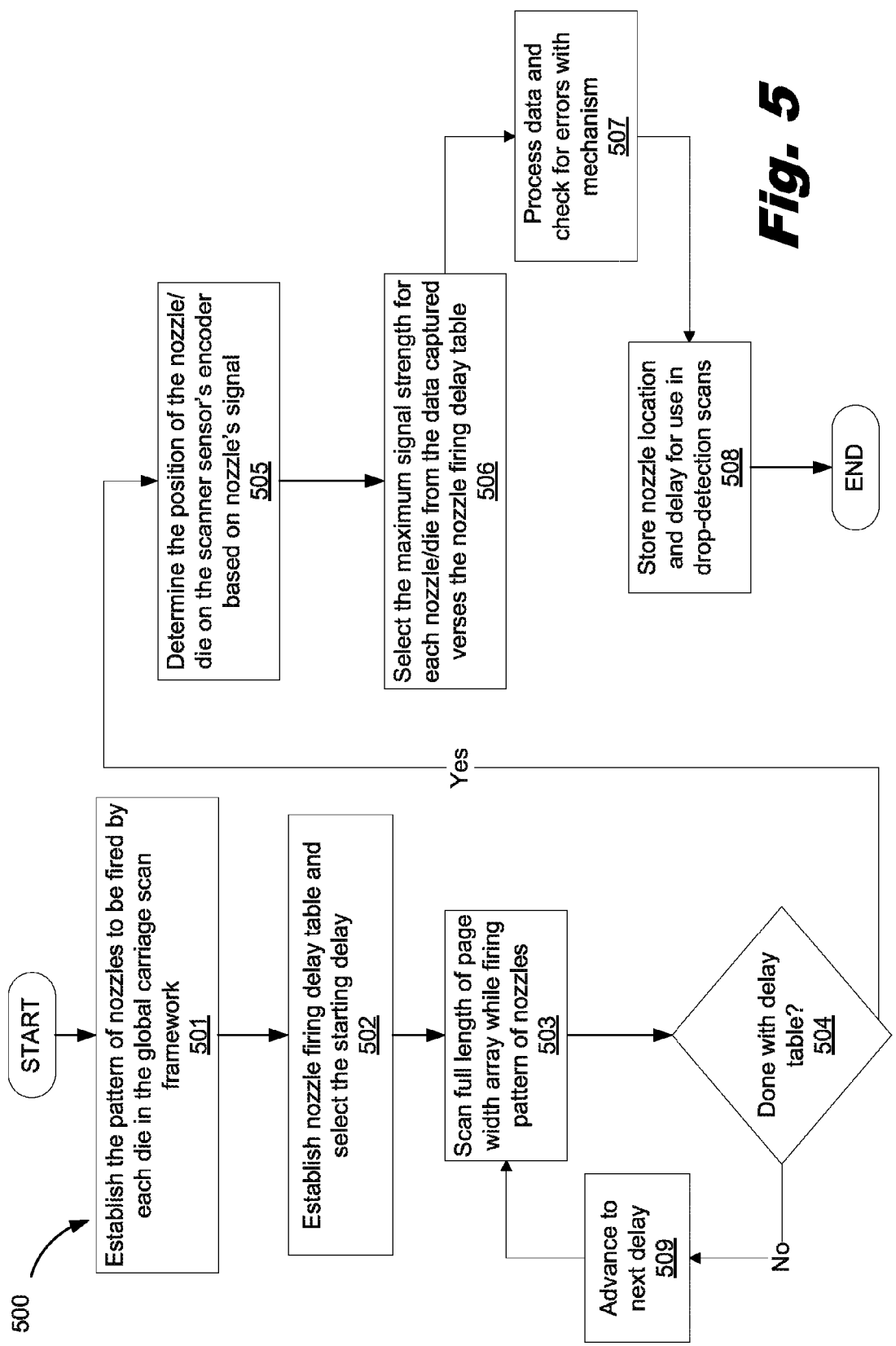
FIG. 5 is a flowchart showing a method to calibrate nozzle positioning with respect to the scanning sensor's carriage encoder, according to one example of principles described herein.

Turning to FIG. 5, FIG. 5 is a flowchart showing a method to calibrate nozzle firing with respect to the movement of the drop detector. As noted above, the drop detector (FIG. 1, 22) includes a moveable carriage that allows the drop detector to check for proper nozzle operation at different positions along the length of the print bar (FIG. 1, 38). An encoder (FIG. 1, 54) determines the position of the drop detector relative to the print bar so that the controller (FIG. 1, 46) can position and reposition the drop detector during the drop-detection process. Consequently, if the printing device is being calibrated at start up or upon error recovery, this routine shown in FIG. 5 sets up the nozzles, on a per-die basis, to fire in alignment to any carriage movement.

The controller (FIG. 1, 46) can respond to the carriage encoder (FIG. 1, 54) of the drop detector to determine that the drop detector is properly aligned with respect to the nozzles of the print bar when detecting for ink drops. According to certain illustrative examples, this calibration process includes establishing (501) a pattern of nozzles to be fired from each die while the drop detector is located at a global scan carriage position. In various examples, this firing (501) is done with symmetric patterns, thus allowing the routine to recognize missing nozzles.

Next, a nozzle firing delay table is setup (502). This delay table includes a range of different delays between the firing of different nozzles along the bar. Any one of the delay factors is then selected from the table for use in calibrating the nozzle firing with alignment of the drop detector as the drop detector's carriage moves with respect to the print bar.

With the selected delay, the drop detector is the moves along the full length of the print bar. Nozzle groups along the print bar are fired in the selected symmetric pattern in sequence using the selected delay between firings. The drop detector detects (503) the ejected drops as it moves along the length of the print bar.

After the drop detector has completed it scan along the length of the print bar, a determination (504) is made whether there are any other delay factors in the delay table. If there are, the next delay factor in the table is selected (509) and the drop detector again scans along the length of the print bar while nozzle groups along the print bar are fired according to the selected symmetric pattern in sequence with the new delay factor being used between firings. This continues until all the delay factors in the delay table have been used during a scan of the drop detector along the length of the print bar.

Next, a position for each nozzle or each nozzle die is determined (505). This position is determined in terms of the encoder signal from the carriage. The maximum signal strength for each nozzle or die as registered by the drop detector is noted (506) versus a delay factor from the nozzle firing delay table. This maximum signal strength is used to determine (505) the position of the nozzle or die.

The process then processes (507) this data and checks for any errors in the mechanisms. Following this processing, the nozzle or die locations and a corresponding delay factor are stored (508) for use in subsequent scans of the drop detector to assess nozzle health.

Figure 6:
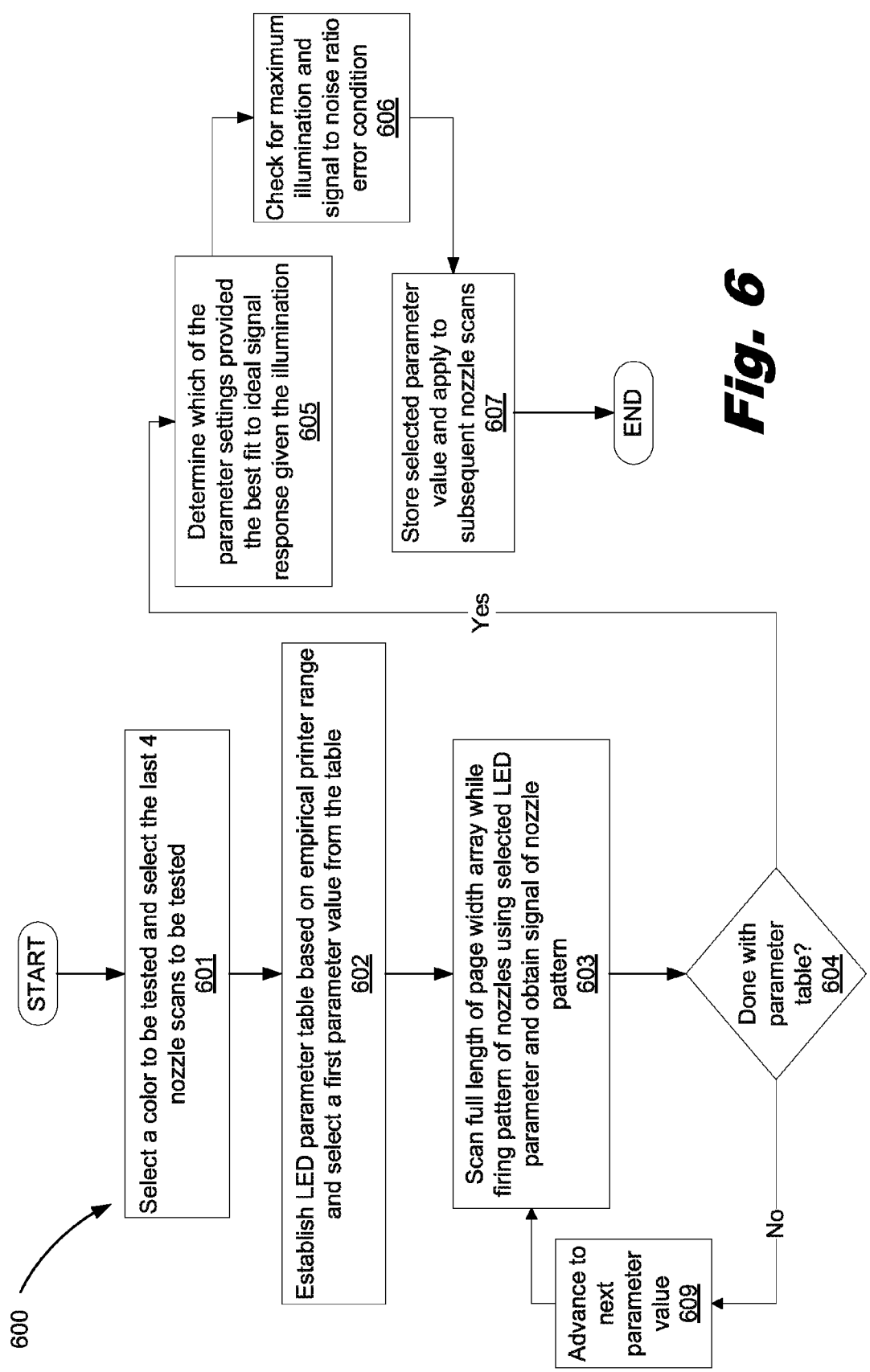
FIG. 6 is a flowchart showing a method to calibrate illumination of drops, according to one example of principles described herein.

Turning to FIG. 6, FIG. 6 is a flowchart showing a method to calibrate LED illumination of drops, according to one example of principles described herein. As mentioned above, the drop detector (FIG. 1, 22) is used to detect the presence or absence of drops ejected from the print bar or to detect characteristics of the drops. As noted above, the drop detector (FIG. 1, 22) is an optical detector that projects light at the print bar and monitors light reflected by fluid drops ejected from the nozzles. In some examples, the drop detector (FIG. 1, 22) is using an infrared Light Emitting Diode (LED) to emit an infrared beam which is backscattered back to the detector by fluid drops ejected from the print bar.

If the illumination is not calibrated correctly, a drop may be dimly illuminated or oversaturated. This may result in an undesired signal-to-noise ratio (SNR) in which characteristics of the ink drop (FIG. 1, 10) may not be properly determined. In some cases, if the ink drop (FIG. 1, 10) is not illuminated properly, the drop detector (FIG. 1, 22) may be unable to distinguish a drop from background noise.

Thus, in order for the drop detector (FIG. 1, 22) to properly detect an ink drop (FIG. 1, 10), the ink drop (FIG. 1, 10) will need to be properly illuminated. Consequently, the method of FIG. 6 provides for the proper illumination of ejected drops by appropriately controlling illumination parameters of the LED operation. For example, a pulse width modulation (PMW) parameter that is used to drive the LED may be adjusted. Additionally or alternatively, the LED power or brightness can be evaluated and calibrated.

The method begins with selecting (601) a color to be tested. In a multi-color printing device, the drop-detection routine is performed separately for each color, where a different set of nozzles will be used to eject ink drops of different colors. As mentioned above, if black ink is selected, clear ink drops are used in the calibration process, including in LED calibration as described below. Alternatively, other colors such as cyan, magenta, and yellow may be used. Each different color may result in an LED calibration for the drop detector (FIG. 1, 22) that varies from color to color.

In some examples, particularly where clear drops are used to detect the health of nozzle for black ink, the last 4 nozzle scans to be tested are also selected. Additionally, the first 4 scans used to calibrate the LED illumination are subsequently used for the rest of the backscatter drop detector scans.

Next, an illumination parameter table is setup (602). This table lists different values for an illumination parameter associated with the LED or other light source of a drop detector and may be based on empirical data from corresponding printing device ranges. As noted above, this parameter may be different PWM values or some other expression of different LED brightness values. In some examples, the drop detector's (FIG. 1, 22) LED brightness is varied using PWM in order to best fit an ideal signal response from drops for each color. Each parameter setting in the table is tested in order to determine the ideal illumination for each color.

Initially, an illumination parameter value is selected (602) from the table. This parameter value is used (603) with the light source of the drop detector as the length of the PWA is scanned while firing nozzles in a selected pattern to obtain a backscattering signal from the drop detector. This process of scanning along the length of the print bar is repeated for each of the parameter values in the table. Thus, after each scan, a determination (604) is made whether all the parameter values in the table have been tested. If not, the next parameter value (609) is selected and another corresponding scan of the print bar is completed.

When all the parameter values in the table have been used (determination 604), the process determines which of the LED parameter values provided the best fit to an ideal backscattering signal. That is, the backscattering signal resulting from each different parameter values is compared to an ideal backscattering signal. This may include checking (606) for maximum illumination of drops, as denoted by a maximum of backscattering signal, and signal-to-noise ratio error condition. The optimal parameter value for each ink color is then stored (607) and applied to subsequent drop-detect nozzle scans.

Error checking using an SNR determines pigment variation as well as degradation of the LED over time. In various examples, an LED may have a certain operational life. The detector may also experience a buildup of ink clouds on the LED and/or sensor. If the SNR is undesirable, further actions may be needed to reduce ink cloud buildup on the LED and/or drop detector sensor or replacement of parts may be needed after a number of years of use. Checking the SNR, each printing device compensates for LED variation, lens variation, and pigment variations as well as degradation over the span of operational life.

FIG. 7 is a flowchart showing a method to reduce the effects of backscatter noise and electrical noise, according to one example of principles described herein. This routine may be executed every time a drop detection process is triggered. First, the drop detector (FIG. 1, 22) scans the full length of print bar, as described herein, without the print bar firing any drops. This allows the controller (FIG. 1, 46) to determine a noise floor and any blind areas that will be taken into account when scanning starts.

Noise interference such as paper dust contaminates, electrical noise, and background noise may overwhelm or saturate the drop detector (FIG. 1, 22) sensor. In such a case, the drop detector (FIG. 1, 22) sensor is unable to correctly adjust parameters such as, setting pen height, aligning the carriage encoder (FIG. 1, 54) with each nozzle, and calibrating the LED on the drop detector for optimal drop detection conditions.

Thus, the illustrated method includes scanning (701) the full length of the PWA without firing drops to analyze waveforms captured. By not firing drops, the system can analyze the ambient background noise that may impede subsequent drop detection and nozzle health determinations. A black bar may be placed behind the drop-detector's sensor in such a fashion that the black bar will absorb all the LED's infrared (IR) light so that none is reflected to the drop-detector's sensor. Thus, any signal generated by the drop-detector's sensor represents background noise. If the background noise is greater than a signal being obtained from reflection of the LED's light, the drop detector's output signal will be overwhelmed by the background noise. Consequently, the drop detector (FIG. 1, 22) is unable to determine the state of the nozzles.

The waveforms captured during this check for background noise can also be analyzed for signatures that indicate a dead zone (702) or magnitude issue (703). A dead zone may be caused by areas contaminated by paper dust that may saturate the drop detector's sensor. If the drop-detector's sensor is saturated by paper dust, the drop-detect sensor may see an increase in background noise or become unresponsive altogether. A magnitude check (703) may average data from the drop detector to see if a high signal threshold is crossed. This will indicate an unacceptable signal-to-noise ratio.

If any a dead zone is identified or any area where the signal magnitude crosses the high signal threshold, that area is identified as a blind zone (704) where the drop detector is unable to provide a useful reading, such as where the drop detector is overwhelmed by background noise. A database of any such blind zones is created and stored for use in properly interpreting the output of the drop detector during subsequent operation.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system for drop detection of fluid drops ejected by a printing device, said system comprising:
   a drop detector comprising a radiation source and radiation sensor for illuminating a region in which drops are ejected by a print bar and detecting radiation from said radiation source that is reflected by backscattering from said drops to said radiation sensor; and
   a controller for controlling said drop detector and said print bar, wherein said controller uses a signal output by said drop detector to determine whether nozzles of said print bar are operating properly;
   wherein said drop detector comprises a carriage for moving said drop detector along a length of said print bar during drop detection; and,
   wherein, prior to drop detection, said controller calibrates locations of said nozzles to positioning of said carriage.

2. The system of claim 1, wherein said controller operates said print bar so as to separate black pigment from a carrier fluid in said nozzles so that drops of the carrier fluid are ejected during drop detection.

3. The system of claim 1, further comprising an encoder with said carriage for outputting an indication of a position of said carriage.

4. The system of claim 1, wherein said controller comprises a firing delay table, said controller calibrating locations of said nozzles to positioning of said carriage by firing drops from nozzles of said print bar in a patterned sequence according to different delay factors from said firing delay table.

5. The system of claim 1, further comprising a fan for removing an aerosol cloud from said region.

6. The system of claim 1, wherein said print bar has a height relative to said drop detector such that said print bar does not occlude said drop detector from detecting drops in said region.

7. The system of claim 1, wherein said print bar comprises a page width array.

8. The system of claim 1, wherein said controller comprises a database of blind spots comprising locations along said print bar at which background noise has been found to decrease a signal-to-noise ratio of said drop detector below a threshold.

9. The system of claim 1, wherein said controller determines an optimal illumination parameter for said drop detector by operating said drop detector at a number of different illumination parameters and comparing results of this operation to an ideal signal response for said drop detector.

10. A system for drop detection of fluid drops ejected by a printing device, said system comprising:
    a drop detector comprising a radiation source and radiation sensor for illuminating a region in which drops are ejected by a print bar and detecting radiation from said radiation source that is reflected by backscattering from said drops to said radiation sensor; and
    a controller for controlling said drop detector and said print bar, wherein said controller uses a signal output by said drop detector to determine whether nozzles of said print bar are operating properly;
    wherein said controller operates said print bar so as to separate black pigment from a carrier fluid in said nozzles so that drops of the carrier fluid are ejected during drop detection.

11. The system of claim 10, wherein:
    said drop detector comprises a carriage for moving said drop detector along a length of said print bar during drop detection;
    prior to drop detection, said controller calibrates locations of said nozzles to positioning of said carriage; and,
    said controller comprises a firing delay table, said controller calibrating locations of said nozzles to positioning of said carriage by firing drops from nozzles of said print bar in a patterned sequence according to different delay factors from said firing delay table.

12. A method for drop detection of fluid drops ejected by a printing device, said method comprising:
    with a drop detector comprising a radiation source and radiation sensor, illuminating a region in which drops are ejected by a print bar and detecting radiation from said radiation source that is reflected by backscattering from said drops to said radiation sensor;
    with a controller that controls said drop detector and said print bar, using a signal output by said drop detector to determine whether nozzles of said print bar are operating properly; and
    with the controller that also controls a carriage for moving said drop detector along a length of said print bar during drop detection, calibrating locations of said nozzles to positioning of said carriage.

13. The method of claim 12, further comprising, with said controller, operating said print bar so as to separate black pigment from a carrier fluid in said nozzles so that drops of the carrier fluid are ejected during drop detection.

14. The method of claim 12, further comprising setting height of said print bar relative to said drop detector such that said print bar does not occlude said drop detector from detecting drops in said region.

15. The method of claim 12, further comprising determining an optimal illumination parameter for said drop detector by operating said drop detector at a number of different illumination parameters and comparing results of this operation to an ideal signal response for said drop detector.

16. The method of claim 12, further comprising scanning a full length of the print bar without the print bar firing any drops to determine a noise floor or blind areas to be accounted when drop detection is performed.

17. The system of claim 1, wherein the radiation source of the drop detector comprises an infrared beam emitter.

18. The system of claim 1, wherein the controller performs drop detection repeatedly, once for each color of ink ejected by the print bar.

19. The system of claim 4, wherein the timing delay table comprises delays specific to each color of ink ejected by the print bar.

20. The system of claim 11, wherein the timing delay table comprises delays specific to each color of ink ejected by the print bar.

* * * * *